United States Patent [19]

Niihara et al.

[11] Patent Number: 5,173,459
[45] Date of Patent: Dec. 22, 1992

[54] $Si_3N_4$-$Al_2O_3$ COMPOSITE SINTERED BODIES AND METHOD OF PRODUCING THE SAME

[75] Inventors: Koichi Niihara, 1-2-2, Hashirimizu-Shukusha, University, 25, Hashirimizu 2-Chome, Yokosuka, Kanagawa Pref.; Atsushi Nakahira, Yokosuka; Toshio Hirai, 4-91, Takamori 3-Chome, Izumi, Miyagi Pref., all of Japan

[73] Assignees: Koichi Niihara; Toshio Hirai; NGK Insulators, Ltd., all of Japan

[21] Appl. No.: 611,338

[22] Filed: Jul. 23, 1990

Related U.S. Application Data

[63] Continuation of Ser. No. 266,872, Nov. 3, 1988, abandoned.

[30] Foreign Application Priority Data

Nov. 9, 1987 [JP] Japan .................................. 62-281061

[51] Int. Cl.⁵ ............................................. C04B 35/58
[52] U.S. Cl. ......................................... 501/97; 501/98
[58] Field of Search ................................... 501/97, 98

[56] References Cited

U.S. PATENT DOCUMENTS 3,903,230  9/1975  Kamigaito et al. ................... 501/97
3,991.166 11/1976  Jack et al. .............................. 501/98

FOREIGN PATENT DOCUMENTS 0100380  2/1984  European Pat. Off. .
0141366  5/1985  European Pat. Off. .

OTHER PUBLICATIONS

Chemical Abstracts, vol. 107, No. 20, Nov. 16, 1987, p. 385, Abstract No. 182063f, Columbus, Ohio; and JP-A-62 187 174 (Japan Auto Parts Industries Assoc.), Aug. 15, 1987.

*Primary Examiner*—Theodore Morris
*Assistant Examiner*—David M. Brunsman
*Attorney, Agent, or Firm*—Parkhurst, Wendel & Rossi

[57] ABSTRACT

An $Si_3N_4$-$Al_2O_3$ composite sintered body suitable for use in high-temperature structural materials consists of $\alpha$-$Al_2O_3$ and at least one crystal phase of $Si_3N_4$ and sialon and is produced by sintering a shaped body of a particular $Si_3N_4$-$Al_2O_3$ mixed powder at 1,500°–1,900° C.

5 Claims, No Drawings

$Si_3N_4$-$Al_2O_3$ COMPOSITE SINTERED BODIES AND METHOD OF PRODUCING THE SAME

This is a continuation of application Ser. No. 07/266,872 filed Nov. 3, 1988, now abandoned.

BACKGROUND OF THE INVENTION

1. Field of the Invention

This invention relates to $Si_3N_4$-$Al_2O_3$ composite sintered bodies and a method of producing the same. More particularly the invention relates to $Si_3N_4$-$Al_2O_3$ composite sintered bodies suitable for use in structural materials having high strength at high temperature and a method of producing the same.

2. Related Art Statement $Al_2O_3$ is widely used as a substrate or a package for integrated circuits, a chip for cutting tools or a refractory material. However, the strength of $Al_2O_3$ at a temperature of not lower than 1,000° C. is low compared to a silicon nitride sintered body and silicon carbide sintered body, so that there is a restriction in the use of $Al_2O_3$ as a structural material for engine parts and the like.

In order to increase the strength and toughness of $Al_2O_3$, it has been proposed to disperse SiC whiskers into the $Al_2O_3$. For example, increasing the toughness of the $Al_2O_3$ sintered body through dispersion of SiC whiskers is disclosed in American Ceramics Society Bulletin, 64[2], 298-304 (1985). However, when this sintered body is heated in air, the oxidation of SiC violently occurs to lower the strength, and the sintered body can not be used at a high temperature for a long time.

Further, Japanese Patent laid open Nos. 55-126,574, No. 59-78,972 and 62-187,174 disclose that when $Si_3N_4$ is added to $Al_2O_3$, the strength, toughness and hardness are increased in the resulting $Al_2O_3$ sintered body dispersing $Si_3N_4$ particles dispersed therein or in the resulting sintered body in which $Al_2O_3$ particles are dispersed into a sialon matrix. In these sintered bodies, however, the high temperature properties are not mentioned at all, or the satisfactory increase of the strength and toughness can not be achieved, or the high-temperature strength can not be expected due to the presence of sintering aids such as spinel or the like.

SUMMARY OF THE INVENTION

It is, therefore, an object of the invention to solve the aforementioned drawbacks of the conventional technique and to provide $Si_3N_4$-$Al_2O_3$ composite sintered bodies, which have high strength from room temperature to higher temperatures and an excellent oxidation resistance, and are suitable for use in structural materials such as engine parts and the like, and a method of producing the same.

According to a first aspect of the invention, there is the provision of an $Si_3N_4$-$Al_2O_3$ composite sintered body, consisting of $\alpha$-$Al_2O_3$ and at least one crystal phase of $Si_3N_4$ and sialon obtained by sintering a mixed powder comprising 10-45 mol % of $Si_3N_4$ and the balance being $Al_2O_3$ powder, in which a content of metallic element other than Si and Al is not more than 0.5% by weight, at 1,500°-1,900° C.

According to a second aspect of the invention, there is the provision of a method of producing an $Si_3N_4$-$Al_2O_3$ composite sintered body, which comprises shaping a mixed powder comprising 10-45 mol % of $Si_3N_4$ and the balance being $Al_2O_3$ powder, in which a content of metallic element other than Si and Al is not more than 0.5% by weight, and then sintering it at 1,500°-1,900° C.

DESCRIPTION OF THE PREFERRED EMBODIMENTS

The $Si_3N_4$-$Al_2O_3$ composite sintered body according to the invention and the production method thereof will be described in detail below.

As a starting mixed powder, it is preferred that the $Si_3N_4$ powder and $Al_2O_3$ powder, to have a high purity and are finely ground. Further, the content of metallic element other than Si and Al should not be more than 0.5% by weight in the mixed powder because the metallic element impurity remains at a vitreous state in the sintered body to degrade the high-temperature properties. Moreover, it is preferred that the $Si_3N_4$ powder have an oxygen content of not more than 2% by weight and a particle size of not more than 5 μm. As the starting $Al_2O_3$ powder, $\gamma$-$Al_2O_3$ or the like may be used if it is converted into $\alpha$-$Al_2O_3$ after the firing. The starting $Si_3N_4$ powder may be $\alpha$-type or $\beta$-type. Thus, there is provided a mixed powder for subsequent shaping comprising 10-45 mol % of the above $Si_3N_4$ powder and the balance being $Al_2O_3$ powder, in which a content of metallic element other than Si and Al is not more than 0.5% by weight. In this case, the sintering aid should not be added because it remains at a vitreous state in the sintered body to degrade the high-temperature properties likewise the above impurity. The mixing is carried out under a wet or dry state by means of a ball mill or the like. The resulting mixed powder is shaped into a desired form by dry pressing, injection molding or the like.

The shaped body made from the mixed powder of $Si_3N_4$ powder and $Al_2O_3$ powder is densified by pressureless sintering, hot pressing, or hot isostatic pressing (HIP), during which a part or a whole of $Si_3N_4$ reacts with $Al_2O_3$ to form sialon. On the other hand, a part of $Al_2O_3$ reacts with $Si_3N_4$ as mentioned above, but the remaining portion of $Al_2O_3$ remains as $\alpha$-$Al_2O_3$. Thus, $Si_3N_4$-$Al_2O_3$ composite sintered body consisting of $\alpha$-$Al_2O_3$ and at least one crystal phase of $Si_3N_4$ and sialon according to the invention is obtained by these reactions. The sintering temperature is preferable to be 1,500°-1,900° C. for these reactions and the densification. When the sintering temperature is lower than 1,500° C., the sintered body is not sufficiently densified, while when it exceeds 1,900° C., the grain growth of $Si_3N_4$ and $Al_2O_3$ and the evaporation reaction become violent, thus causing reduction of strength and bulk density and degradation of high-temperature properties.

In the mixed powder, the content of $Si_3N_4$ powder should be within a range of 10-45 mol %. When the content is less than 10 mol %, the addition effect of $Si_3N_4$ is lost, while when it exceeds 45 mol %, the whole of the sintered body is changed into sialon to lose the composite effect. Preferably, the content of $Si_3N_4$ is within a range of 25-45 mol %.

As the firing atmosphere, an inert gas atmosphere such as nitrogen, argon or the like is preferable for preventing the oxidation of $Si_3N_4$. As the hot isostatic pressing, there may be performed a method wherein a presintered body having less open porosity is previously produced by the pressureless sintering or the hot pressing and then subjected to the hot isostatic pressing, or a method wherein the shaped body is airtightly sealed with a metal, glass or the like and then subjected to the hot isostatic pressing.

The invention will be described with reference to the following example.

EXAMPLE $\alpha$-$Si_3N_4$ powder having a content of metallic element impurity other than Si and Al of 0.2% by weight and a purity of 98% and $\alpha$-$Al_2O_3$ powder having an average particle size of 0.5 $\mu$m and a purity of not less than 99.8% were mixed at a mixing ratio as shown in the following Table 1 and further mixed in a polyethylene container containing iron balls each coated with polyethylene under a wet state of acetone for 10 hours. The thus obtained mixed powder was previously shaped into a size of 50 mm in diameter and 10 mm in thickness and pressed under a pressure of 200 MPa. Then shaped body then hot pressed at a temperature shown in Table 1 under a pressure of 30 MPa to obtain $Si_3N_4$-$Al_2O_3$ composite sintered bodies of Examples 1-5 according to the invention and Comparative Examples 6 and 7. Further, the same procedure as mentioned above was repeated, except that $Y_2O_3$ or MgO having a purity of not less than 99% was further added to the mixed powder, to obtain the composite sintered bodies of Comparative Examples 8 and 9. All of these sintered bodies were dense sintered bodies having a porosity of not more than 1%.

In Table 1 are shown results on the crystal phase observed by an X-ray diffraction method in Examples 1-5 and Comparative Examples 6-9. Further, in Examples 1-5 and Comparative Examples 6-9, the three-point flexural strengths at room temperature and 1,300° C. were measured according to a method of JIS R1601 to obtain results as shown in Table 1. Moreover, the increase of weight per unit surface area in Examples 1-5 and Comparative Examples 6-9 was measured after the heating at 1,300° C. for 100 hours to obtain results as shown in Table 1.

As seen from the above results, in the $Si_3N_4$-$Al_2O_3$ composite sintered bodies according to the invention, the three-point flexural strength at 1,300° C. is not less than 500 MPa, so that there is no lowering of the strength from the strength value at room temperature, and also the increase of weight through oxidation at 1,300° C. for 100 hours is not more than 0.1 mg/cm$^2$. That is, the sintered bodies according to the invention are high in the strength at high temperature and excellent in the oxidation resistance as compared with those of the comparative examples.

As mentioned above, the $Si_3N_4$-$Al_2O_3$ composite sintered body according to the invention consists of $\alpha$-$Al_2O_3$ and at least one crystal phase of $Si_3N_4$ and sialon and has a strength of not less than 500 MPa over a temperature range of room temperature to 1,300° C. and an excellent oxidation resistance, so that it is applicable to high-temperature structural materials such as engine parts and the like.

What is claimed is:

1. An $Si_3N_4$-$Al_2O_3$ composite sintered body, consisting of $\alpha$-$Al_2O_3$ and at least one crystal phase selected from the group consisting of $Si_3N_4$ and sialon, said sintered body being obtained by sintering a mixed powder comprising 10-45 mol % $Si_3N_4$ and the balance being $Al_2O_3$ powder, in which a content of metallic element other than Si and Al is not more than 0.5% by weight, at 1,500°-1,900° C.;

wherein said sintered body exhibits an increase of weight through oxidation of not greater than 0.1 mg/cm$^2$ after heating at 1,300° C. for 100 hours.

2. The $Si_3N_4$-$Al_2O_3$ composite sintered body according to claim 1, wherein said mixed powder contains 25-45 mol % of $Si_3N_4$.

3. The $Si_3N_4$-$Al_2O_3$ composite sintered body of claim 1, wherein said sintered body has a three-point flexural strength at 1,300° C. of not less than 500 MPa.

4. A method of producing an $Si_3N_4$-$Al_2O_3$ composite sintered body, which comprises shaping to form a shaped body a mixed powder comprising 10-45 mol % of $Si_3N_4$ and the balance being $Al_2O_3$ powder, in which a content of metallic element other than Si and Al is not more than 0.5% by weight, and then sintering said shaped body at 1,500°-1,900° C.;

wherein said sintered body exhibits an increase of weight through oxidation of not greater than 0.1 mg/cm$^2$ after heating at 1,300° C. for 100 hours.

5. The method of claim 4, wherein said sintered body has a three-point flexural strength at 1,300° C. of not less than 500 MPa.

TABLE 1

| | | Composition of mixed powder (mol %) | | Sintering aid (wt %) | | Sintering temperature (°C.) | Crystal phase | Three-point flexural strength (MPa) | | Increase of weight through oxidation (mg/cm$^2$) |
|---|---|---|---|---|---|---|---|---|---|---|
| | | $Si_3N_4$ | $\alpha$-$Al_2O_3$ | | | | | room temperature | 1300° C. | |
| Example | 1 | 10 | 90 | | | 1500 | $\alpha$-$Al_2O_3$, $Si_3N_4$ | 510 | 500 | <0.1 |
| | 2 | 20 | 80 | | | 1800 | $\alpha$-$Al_2O_3$, sialon | 530 | 530 | <0.1 |
| | 3 | 25 | 75 | | | 1700 | $\alpha$-$Al_2O_3$, sialon | 610 | 580 | <0.1 |
| | 4 | 40 | 60 | | | 1900 | $\alpha$-$Al_2O_3$, $Si_3N_4$, sialon | 620 | 610 | <0.1 |
| | 5 | 45 | 55 | | | 1500 | $\alpha$-$Al_2O_3$, $Si_3N_4$, sialon | 600 | 550 | <0.1 |
| Comparative | 6 | 5 | 95 | | | 1700 | $\alpha$-$Al_2O_3$, $Si_3N_4$ | 430 | 200 | <0.1 |
| | 7 | 50 | 50 | | | 1500 | sialon | 450 | 430 | 0.3 |
| Example | 8 | 30 | 70 | MgO | 2 | 1750 | $\alpha$-$Al_2O_3$, sialon | 550 | 230 | >1.0 |
| | 9 | 30 | 70 | $Y_2O_3$ | 3 | 1650 | $\alpha$-$Al_2O_3$, sialon | 540 | 280 | 0.5 |